(12) United States Patent
Ito et al.

(10) Patent No.: US 8,030,882 B2
(45) Date of Patent: Oct. 4, 2011

(54) POWER SUPPLY UNIT

(75) Inventors: Hiroo Ito, Kariya (JP); Sadanori Suzuki, Kariya (JP)

(73) Assignee: Kabushiki Kaisha Toyota Jidoshokki, Kariya-Shi, Aichi-Ken (JP)

( * ) Notice: Subject to any disclaimer, the term of this patent is extended or adjusted under 35 U.S.C. 154(b) by 74 days.

(21) Appl. No.: 12/138,937

(22) Filed: Jun. 13, 2008

(65) Prior Publication Data
US 2008/0316774 A1   Dec. 25, 2008

(30) Foreign Application Priority Data

Jun. 15, 2007   (JP) .................................. 2007-159013

(51) Int. Cl.
*H02J 7/14* (2006.01)
(52) U.S. Cl. ............ 320/104; 320/138; 307/66; 363/17; 363/37
(58) Field of Classification Search .................. 320/104, 320/138
See application file for complete search history.

(56) References Cited

U.S. PATENT DOCUMENTS

| | | | | |
|---|---|---|---|---|
| 5,633,577 | A * | 5/1997 | Matsumae et al. | 322/37 |
| 5,856,712 | A * | 1/1999 | Suzuki et al. | 307/64 |
| 5,982,645 | A * | 11/1999 | Levran et al. | 363/37 |
| 6,281,660 | B1 | 8/2001 | Abe | |
| 6,297,616 | B1 | 10/2001 | Kubo et al. | |
| 6,479,970 | B2 * | 11/2002 | Reddy | 320/162 |
| 6,794,846 | B2 * | 9/2004 | Tsuji | 320/103 |
| 6,998,821 | B2 * | 2/2006 | Sakai et al. | 320/138 |
| 7,102,251 | B2 * | 9/2006 | West | 307/64 |
| 7,550,861 | B2 | 6/2009 | Oyobe et al. | |
| 7,566,232 | B2 | 7/2009 | Iida | |
| 2006/0244411 | A1 | 11/2006 | Wobben | |

FOREIGN PATENT DOCUMENTS

| | | |
|---|---|---|
| JP | 03-060335 | 3/1991 |
| JP | 08-088907 | 4/1996 |
| JP | 08-317508 | 11/1996 |
| JP | 09-009417 | 1/1997 |
| JP | 09-065509 | 3/1997 |
| JP | 11-008910 | 1/1999 |
| JP | 2000-209786 | 7/2000 |
| JP | 2000-299902 | 10/2000 |
| JP | 2001-008380 | 1/2001 |
| JP | 2002-084604 | 3/2002 |
| JP | 2002-0484604 | 3/2002 |
| JP | 2006-158084 | 6/2006 |
| JP | 2007-110857 | 4/2007 |
| WO | WO 2006-059762 | 6/2006 |

* cited by examiner

*Primary Examiner* — Edward Tso
*Assistant Examiner* — Ramy Ramadan
(74) *Attorney, Agent, or Firm* — Woodcock Washburn LLP

(57) ABSTRACT

A power supply unit that allows a main battery and an auxiliary battery to be charged by a system power supply is disclosed. The first and second bridge circuits of the power supply unit are each formed of four switching elements. The transformer of the power supply unit has a primary winding connected to the first bridge circuit, and a secondary winding connected to the second bridge circuit. The DC/DC converter of the power supply unit allows the auxiliary battery to be connected to the first and second circuits. The controller of the power supply unit controls the switching elements of the first bridge circuit, the switching elements of the second bridge circuit, and the switching element of the DC/DC converter such that power that has been charged to the main battery is output as an AC voltage having voltage and frequency for electric appliances.

7 Claims, 3 Drawing Sheets

POWER SUPPLY UNIT

CROSS-REFERENCE TO RELATED APPLICATIONS

This application claims priority to Japanese Patent Application No. 2007-159013 filed Jun. 15, 2007, the contents of which are hereby incorporated by reference in its entirety.

BACKGROUND

The present invention is related to a power supply unit, more specifically to a power supply unit that is provided with a main battery and an auxiliary battery which supplies a voltage lower than the main battery and allows both batteries to be charged by a system power supply.

A hybrid car that is provided with an engine (internal combustion engine) has been applied to a practical use. In the hybrid car, drive wheels are driven by a motor at starting or in a lower speed range and the drive wheels are driven by the engine in middle and higher speed ranges to reduce fuel consumption and exhaust gas. Recently, a plug-in hybrid car that is provided with a battery that can be charged by a system power supply or a domestic power supply has been proposed to further reduce environmental load. For example, when a motor is driven by a battery that is charged with midnight power, a car can run a longer distance in an electric vehicle mode and the ratio of using electric power is increased compared to the ratio of using gasoline or other fuels. Therefore, compared to a general hybrid car, it is expected to reduce an emission of carbon dioxide and prevent air pollution. Since the system power supply reduces cost compared to supplying electric power separately, a fuel cost can be reduced if a battery is charged with low-cost midnight power.

Japanese Laid-Open Patent Publication No. 8-317508 discloses a charging device provided with a main battery and auxiliary battery that are charged by an external AC power supply. In the charging device disclosed in the publication, when the charging device is disconnected from the AC power supply, the auxiliary battery can be charged with electric power that is charged to the main battery. The charging device is provided with a rectifier, a reactor for smoothing, a switching circuit, and a transformer. The rectifier rectifies the AC power supplied from the AC power supply. The reactor is connected to an output terminal of the rectifier. The switching circuit controls output of the DC power supplied from the rectifier via the reactor. The transformer has a primary winding that is connected to the switching circuit, a secondary winding for the main battery, and a plurarity of secondary wingings for the main battery and the auxiliary battery. The charging device has an element that is connected to the secondary winding for the main battery of the transformer and allows electricity to flow bidirectionally. The charging device further has a switching rectifier circuit and another rectifier circuit. The switching rectifier circuit rectifies the AC voltage induced in the secondary winding and switches an output of the DC voltage supplied from the main battery. The another rectifier circuit is connected to the secondary winding for the auxiliary battery of the transformer and rectifies the AC voltage induced in the secondary winding. Further, the charging device has a control circuit that controls a switching operation of the switching circuit and the switching rectifier circuit.

When various electric appliances are used in a vehicle or outdoors, it has been conventionally required that DC power supplied from the battery of the vehicle be converted to AC power of 100 V by a DC/AC inverter.

In the charging device of the above publication, the AC power supplied from an external AC power supply is rectified by the rectifier, and thereafter supplied to a primary side of the transformer via the switching circuit and charged to the main battery and the auxiliary battery. The power that has been charged to the main battery can be charged to the auxiliary battery via the transformer.

Recently, it has been considered to be important that the electric appliances can be driven by the battery of a vehicle in case of emergency. However, since the main battery and the auxiliary battery of the charging device function as DC power supplies, they do not supply AC power for driving electric appliances. Therefore, it is required to provide a DC/AC inverter separately to use the main battery as a power supply for electric appliances. This increases the size of the device and makes it difficult to obtain a mounting space of the device.

SUMMARY

An objective of the present invention is to provide a power supply unit that allows a main battery and an auxiliary battery to be charged by a system power supply, and is capable of supplying power for electric appliances from at least the main battery as a power supply without being provided with a DC/AC inverter.

To achieve the foregoing objective and in accordance with one aspect of the present invention, a power supply unit that is provided with a main battery and an auxiliary battery which supplies a voltage lower than the main battery is provided. The power supply unit allows the main battery and the auxiliary battery to be charged by a system power supply. The power supply unit includes a first circuit, a second circuit, a transformer, a DC/DC converter, and a controller. The first circuit includes the main battery and a first bridge circuit that is connected to the main battery and formed by four switching elements. The second circuit includes a connecting portion for the system power supply and a second bridge circuit that is connected to the connecting portion and formed by four switching elements. The transformer connects the first circuit and the second circuit to each other in an electrically insulated state. The transformer has a primary winding connected to the first bridge circuit and a secondary winding connected to the second bridge circuit. The DC/DC converter allows the auxiliary battery to be connected to the first and second circuits. The DC/DC converter includes a switching element. The controller controls the switching elements of the first bridge circuit, the switching elements of the second bridge circuit, and the switching element of the DC/DC converter such that power that has been charged to the main battery is output as an AC voltage having voltage and frequency for electric appliances.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF ILLUSTRATIVE EMBODIMENTS

A power supply unit 11 of a plug-in hybrid car according to a first embodiment of the present invention will now be explained with reference to FIG. 1.

Figure 1:
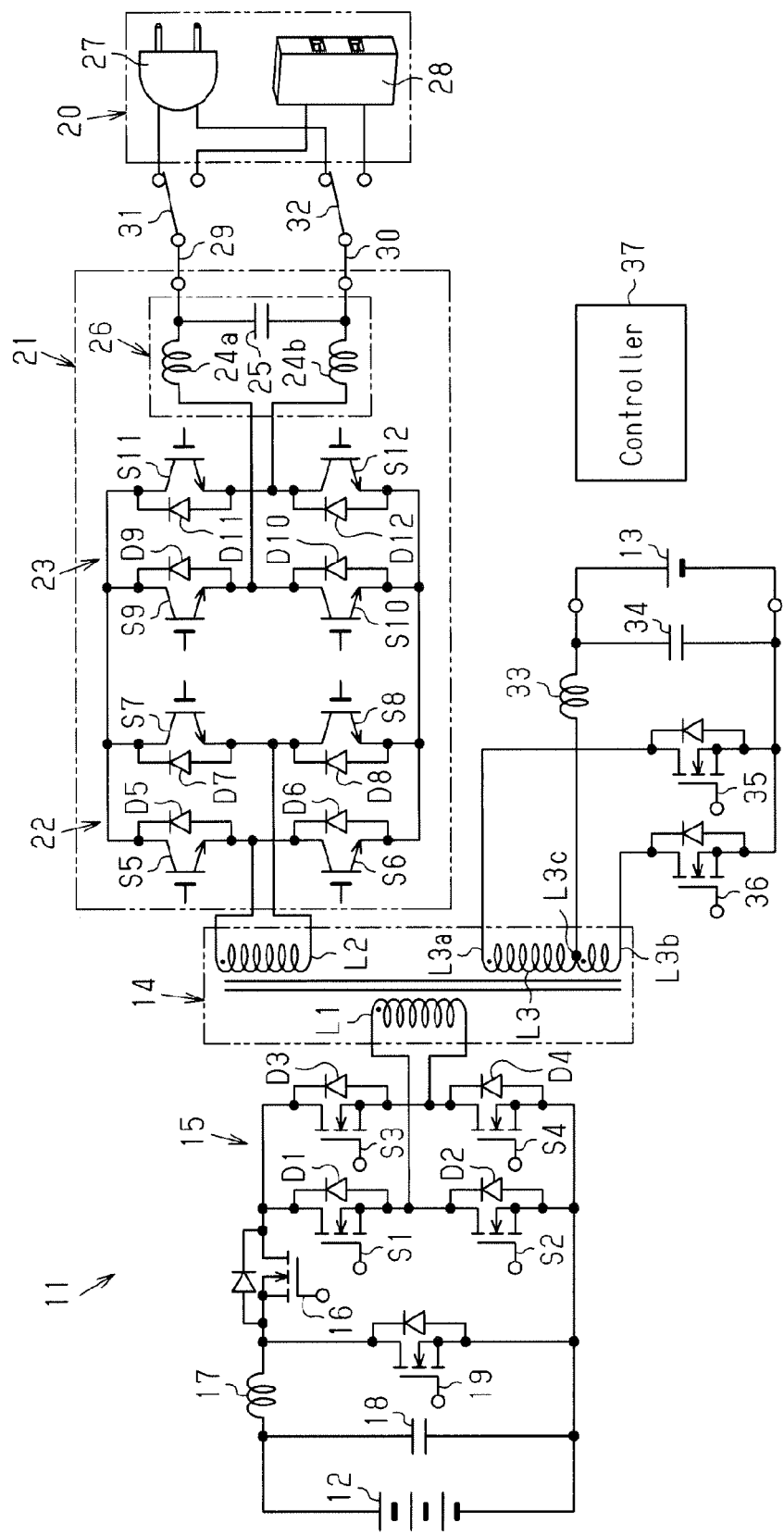
FIG. 1 is a circuit diagram of a power supply unit according to a first embodiment of the present invention.

As shown in FIG. 1, the power supply unit 11 has a main battery 12, an auxiliary battery 13, and a transformer 14. The auxiliary battery 13 supplies voltage lower than that of the main battery 12 and the transformer 14 connects the main battery 12 and a system power supply (not shown) in an electrically insulated state. The output voltage from the main battery 12 is lower than the voltage that drives a driving motor of the vehicle (for example, 500 V) and higher than the voltage that drives auxiliary devices of the vehicle (for example, 12 V or 42 V). The output voltage from the main battery 12 is, for example, 200 V. The output voltage from the auxiliary battery 13 drives the auxiliary devices of the vehicle and is, for example, 12 V or 42 V. The main battery 12 is connected to a motor generator via a booster circuit and an inverter (not shown). The motor generator functions as a three-phase AC motor that generates torque for driving drive wheels of the hybrid car and as a generator that is driven by an engine.

A primary winding L1 of the transformer 14 is connected to a first bridge circuit 15 having four switching elements S1-S4. The switching elements S1-S4 are MOSFETs and form an H bridge circuit. Drains of the switching elements S1 and S3 are connected to each other and connected to a positive terminal of the main battery 12 via a switching element 16 and a coil 17. The switching element 16 is a MOSFET. Sources of the switching elements S2 and S4 are connected to each other and connected to a negative terminal of the main battery 12.

A node between the source of the switching element S1 and the drain of the switching element S2 is connected to a first end of the primary winding L1 of the transformer 14. A node between the source of the switching element S3 and the drain of the switching element S4 is connected to a second end of the primary winding L1 of the transformer 14. Parasitic diodes D1-D4 are provided between the drains and the sources of the switching elements S1-S4 for flowing electric current from the source to the drain.

The node between the positive terminal of the main battery 12 and the first end of the coil 17 is connected to the negative terminal of the main battery 12 via a capacitor 18. The node between the second end of the coil 17 and the source of the switching element 16 is connected to the negative terminal of the main battery 12 via a switching element 19. The switching element 19 is a MOSFET. The source of the switching element 19 is connected to the negative terminal of the main battery 12 and the drain of the switching 20 element 19 is connected to the source of the switching element 16.

The transformer 14 has a first secondary winding L2 and a second secondary winding L3. The first secondary winding L2 is connected to a bidirectional inverter 21 that is connected to a connecting portion 20 that is connected to the system power supply (not shown). The bidirectional inverter 21 has two H bridge circuits 22, 23 as a second bridge circuit and a filter 26 having two coils 24a, 24b and a capacitor 25. The H bridge circuit 22 has four switching elements S5-S8, and the H bridge circuit 23 has four switching elements S9-S12. Each of the switching elements S5-S12 is an insulated gate bipolar type transistor (IGBT). Each collector of the switching elements S5, S7, S9, S11 is connected to each other and each emitter of the switching elements S6, S8, S10, S12 is connected to each other. Each emitter of the switching elements S5, S7, S9, S11 is connected to each corresponding collector of the switching elements S6, S8, S10, S12. The node of the emitter of the switching element S5 and the collector of the switching element S6 is connected to a first end of the first secondary winding L2 of the transformer 14. The node between the emitter of the switching element S7 and the collector of the switching element S8 is connected to a second end of the first secondary winding L2 of the transformer 14. The node between the emitter of the switching element S9 and the collector of the switching element S10 is connected to a first end of the coil 24a. A second end of the coil 24a is connected to a first end of the capacitor 25. The node between the emitter of the switching element S11 and the collector of the switching element S12 is connected to a first end of the coil 24b. A second end of the coil 24b is connected to a second end of the capacitor 25. Diodes D5-D12 are provided between the collectors and the emitters of the switching elements S5-S12. A cathode of each of the diodes D5-D12 is connected to the collector of each of the corresponding switching elements S5-S12. An anode of each of the diodes D5-D12 is connected to the emitter of each of the corresponding switching elements S5-S12.

The connecting portion 20 has a plug 27 that can be connected to an outlet of the system power supply and an outlet 28 as an adapter that can be connected to a plug of an electric appliance. The plug 27 and the outlet 28 are connected to the capacitor 25 of the bidirectional inverter 21 via wirings 29, 30. The wiring 29 has a switch 31 and the wiring 30 has a switch 32. Each of the switches 31, 32 is a changeover contact of a corresponding relay. When the relay is on, the switches 31, 32 electrically connect the plug 27 to the filter 26, and when the relay is off, the switches 31, 32 electrically connect the outlet 28 to the filter 26.

The second secondary winding L3 has an intermediate tap L3c. The intermediate tap L3c is connected to a positive terminal of the auxiliary battery 13 via a coil 33. The node between the coil 33 and the positive terminal of the auxiliary battery 13 is connected to a negative terminal of the auxiliary battery 13 via a capacitor 34. A first end L3a of the second secondary winding L3 is connected to the negative terminal of the auxiliary battery 13 via a switching element 35. The switching element 35 is a MOSFET. The drain of the switching element 35 is connected to the first end L3a of the second secondary winding L3, and the source of the switching element 35 is connected to the negative terminal of the auxiliary battery 13. A second end L3b of the second secondary winding L3 is connected to the negative terminal of the auxiliary battery 13 via a switching element 36. The switching element 36 is a MOSFET. The drain of the switching element 36 is connected to the second end L3b of the second secondary winding L3, and the source of the switching element 36 is connected to the negative terminal of the auxiliary battery 13.

The first bridge circuit 15, the main battery 12, the switching element 16, 19 the coil 17, and the capacitor 18 25 form a first circuit. The connecting portion 20, the H bridge circuits 22, 23, and the filter 26 form a second circuit.

The first bridge circuit 15, the transformer 14, the coil 33, the capacitor 34, and the switching elements 35, 36 form a DC/DC converter that converts the DC voltage supplied from the main battery 12 to the DC voltage that is charged to the auxiliary battery 13 or converts the DC voltage supplied from the auxiliary battery 13 to the DC voltage that is charged to the main battery 12. The H bridge circuit 22, the transformer 14, the coil 33, the capacitor 34, and the switching elements 35, 36 form a DC/DC converter that converts the DC voltage supplied from the H bridge circuit 23 to the DC voltage that is charged to the auxiliary battery 13 or converts the DC voltage supplied from the auxiliary battery 13 to the DC voltage that is supplied to the H bridge circuit 23. In other words, the auxiliary battery 13 is connected to the main battery 12 (first circuit) and the connecting portion 20 (second circuit) via the DC/DC converter. The auxiliary battery 13 is connected to the main battery 12 (first circuit) and the connecting portion 20 (second circuit) via the transformer 14.

A controller 37 sends control signals to each gate of the switching elements S1-S4 of the first bridge circuit 15, each gate of the switching elements S5-S12 of the H bridge circuits 22, 23, and each gate of the switching elements 35, 36 of the DC/DC converter. The controller 37 sends a control signal to each gate of the switching elements 16, 19 and sends control signals for controlling the connection states of the switches 31, 32. The controller 37 controls the bidirectional inverter 21 to charge the main battery 12 and the auxiliary battery 13 with the system power supply or controls the bidirectional inverter 21 to function as an inverter that converts the DC voltage supplied from the main battery 12 to the AC voltage having the voltage and frequency that can be used for electric appliances when the motor generator is not operating.

Next, an operation of the power supply unit 11 is explained.

When the system power supply charges the main battery 12, the plug 27 is connected to the outlet of the system power supply (for example, a 100 V home outlet). Then, the plug 27 is electrically connected to the filter 26 via the switches 31, 32. The AC voltage is supplied to the H bridge circuit 23 from the system power supply via the plug 27 and the filter 26. The switching elements S9-S12 of the H bridge circuit 23 are controlled to be switched by a control signal sent from the controller 37 so as to convert the AC voltage supplied from the system power supply to the DC voltage. The converted DC voltage is supplied to the H bridge circuit 22. The switching elements S5-S8 are controlled to be switched according to a duty cycle that is defined by the control signal sent from the controller 37 such that the AC of predetermined charging voltage (rated charging voltage of the main battery 12) is obtained from the primary winding L1 of the transformer 14.

The voltage value according to the duty cycle, that is, the AC voltage having the rated charging voltage of the main battery 12 is supplied to the first secondary winding L2 of the transformer 14.

Figure 2A:
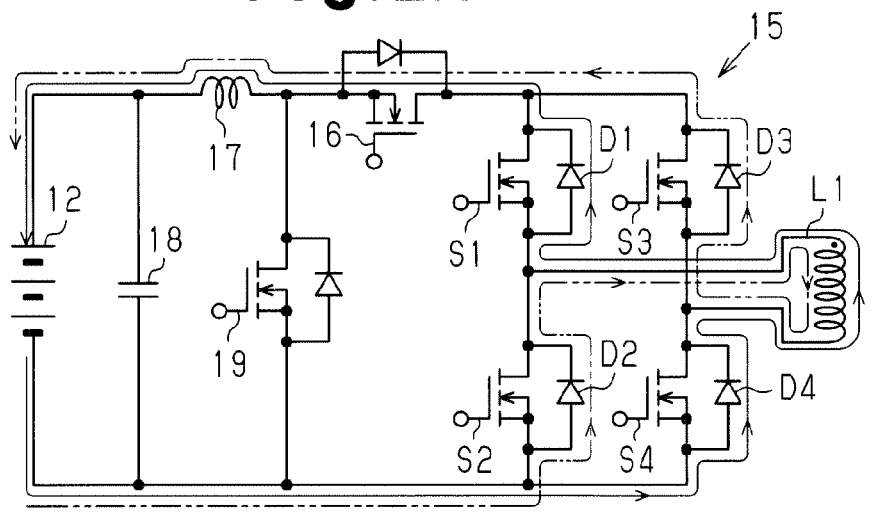
FIGS. 2A and 2B are partial circuit diagrams for explaining an operation of the power supply unit of FIG. 1.

When the switching element 16 is maintained to be on, the switching element 19 is maintained to be off, and each of the switching elements S1-S4 of the first bridge circuit 15 is controlled, the AC voltage induced in the primary winding L1 is converted to the DC voltage and charged to the main battery 12. Specifically, as shown by a solid line in FIG. 2A, when the first end of the primary winding L1 has a higher potential than the second end of the primary winding L1, the switching elements S1-S4 are controlled to be off. At this time, an electric current induced in the primary winding L1 flows in the order of the parasitic diode D4→the primary winding L1→the parasitic diode D1→the switching element 16→the coil 17→the main battery 12. As a result, the electric power induced in the primary winding L1 is charged to the main battery 12. As shown by a two-dot chain line in FIG. 2A, when the first terminal of the primary winding L1 has a lower potential than the second terminal of the primary winding L1, the switching elements S1-S4 are controlled to be off. At this time, an electric current induced in the primary winding L1 flows in the order of the parasitic diode D2→the primary winding L1→the parasitic diode D3→the switching element 16→the coil 17→the main battery 12. As a result, the electric power induced in the primary winding L1 is charged to the main battery 12. This will be repeated to charge the main battery 12.

When the auxiliary battery 13 is charged by the system power supply, the AC voltage is supplied to the H bridge circuit 23 from the system power supply via the plug 27 and the filter 26 in a state that the plug 27 is connected to the outlet of the system power supply. Accordingly, the AC voltage is converted to the DC voltage in the H bridge circuit 23. The DC voltage is supplied to the H bridge circuit 22. The switching elements S5-S8 of the H bridge circuit 22 are controlled to be switched according to a duty cycle that is defined by the control signal sent from the controller 37 such that an AC of predetermined charging voltage (rated charging voltage of the auxiliary battery 13) is obtained from the second secondary winding L3 of the transformer 14. The voltage value according to the duty cycle, that is the AC voltage having the rated charging voltage of the auxiliary battery 13 is supplied to the first secondary winding L2 of the transformer 14.

Figure 2B:
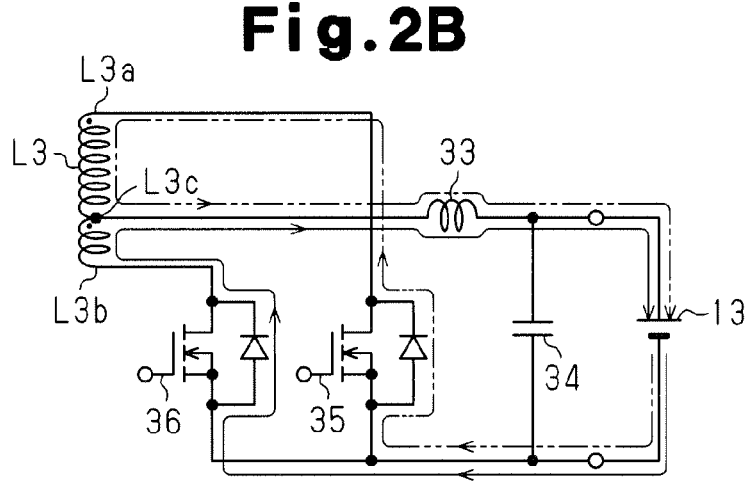

The switching elements 35, 36 are controlled to convert the AC voltage induced in the second secondary winding L3 to a DC voltage and charge the auxiliary battery 13. Specifically, as shown by a solid line in FIG. 2B, when the second end L3b of the second secondary winding L3 has a higher potential than the intermediate tap L3c, the switching elements 35, 36 are controlled to be off. At this time, an electric current induced in the second secondary winding L3 flows in the order of the parasitic diode of the switching element 36 the second end L3b→the second secondary winding L3→the intermediate tap L3c→the coil 33→the auxiliary battery 13. As a result, the electric power induced in the second secondary winding L3 is charged to the auxiliary battery 13. As shown by a two-dot chain line in FIG. 2B, when the first end L3a of the second secondary winding L3 has a higher potential than the intermediate tap L3c, the switching elements 35, 36 are controlled to be off. At this time, an electric current induced in the second secondary winding L3 flows in the order of the parasitic diode of the switching element 35→the first end L3a→the second secondary winding L3→the intermediate tap L3c→the coil 33→the auxiliary battery 13. As a result, the electric power induced in the second secondary winding L3 is charged to the auxiliary battery 13. This will be repeated to charge the auxiliary battery 13.

Figure 3:
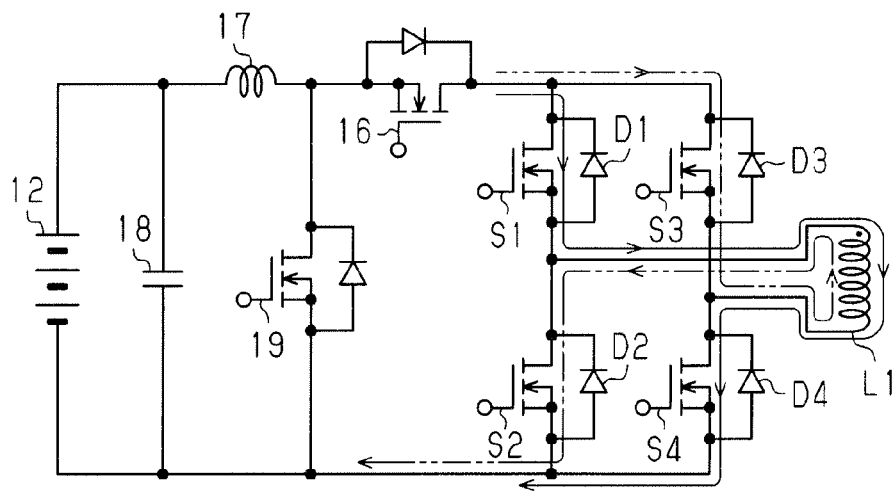
FIG. 3 is a partial circuit diagram for explaining the operation of the power supply unit of FIG. 1.

When the auxiliary battery 13 is charged by the main battery 12, each of the switching elements 16, 19 is controlled to be on and off and the switching elements S1, S4 and the switching elements S2, S3 are controlled to be on and off alternately. As a result, the AC voltage is supplied to the primary winding L1, and accordingly an AC voltage is induced in the second secondary winding L3. Specifically, when the switching elements S1, S4 are on and the switching elements S2, S3 are off, the electric current flows from the first end to the second end of the primary winding L1 as shown by a solid line in FIG. 3. When the switching elements S1, S4 are off and the switching elements S2, S3 are on, the electric current flows from the second end to the first end of the primary winding L1 as shown by the two-dot chain line in FIG. 3.

On the other hand, the switching elements 35, 36 that are connected to the second secondary winding L3 are controlled to convert the AC voltage induced in the second secondary winding L3 to the DC voltage and charge the auxiliary battery 13 with the converted DC voltage. Specifically, as in the case where the auxiliary battery 13 is charged by the system power supply, each of the switching elements 35, 36 is maintained to be off, and the auxiliary battery 13 is charged.

When the main battery 12 is charged by the auxiliary battery 13, the switching elements 35, 36 are controlled to be on and off alternately. Accordingly, the AC voltage is supplied to the second secondary winding L3 and an AC voltage is induced in the primary winding L1. Specifically, when the switching element 35 is on and the switching element 36 is off, the electric current induced in the second secondary winding L3 flows in the order of the coil 33→the intermediate tap L3c→the second secondary winding L3 the first end L3a the switching element 35 the auxiliary battery 13. When the switching element 35 is off and the switching element 36 is on, the electric current induced in the second secondary winding L3 flows in the order of the coil 33→the intermediate tap L3c→the second secondary winding L3→the second end L3b→the switching element 36 the auxiliary battery 13.

In this case, as in the case where the main battery 12 is charged by the system power supply, the switching element 16 is maintained to be on and the switching element 19 is maintained to be off and each of the switching elements S1-S4 is controlled to be off. In this sate, the AC voltage that is induced in the primary winding L1 corresponding to the AC voltage flowing through the second secondary winding L3 when the switching elements 35, 36 are controlled to be on and off alternately is converted to the DC voltage and the converted DC voltage is charged to the main battery 12.

When the electric power of the main battery 12 is output from the connecting portion 20 as the AC voltage having the voltage and frequency for the electric appliances, the switches 31, 32 are switched to electrically connect the outlet 28 and the filter 26 to each other. In other words, the outlet 28 is connected to the bidirectional inverter 21. The plug of the electric appliance is connected to the outlet 28. In this state, the switching elements S1-S4 of the first bridge circuit 15 are controlled to be switched by the control signal sent from the controller 37 such that an AC having a predetermined voltage (for example, 100 V) is obtained from the first secondary winding L2 of the transformer 14. Specifically, as in the case where the auxiliary battery 13 is charged, the switching elements 16, 19 are controlled to be on and off and the switching elements 51, S4 and the switching elements S2, S3 are controlled to be on and off alternately. As a result, the AC voltage is supplied to the primary winding L1 and an AC voltage is induced in the first secondary winding L2.

On the other hand, the switching elements S5-S8 of the H bridge circuit 22 of the bidirectional inverter 21 that is connected to the first secondary winding L2 are controlled to convert the AC voltage that is induced in the first secondary winding L2 to the DC voltage. The converted DC voltage is supplied to the H bridge circuit 23. Each of the switching elements 59-S12 of the H bridge circuit 23 is controlled to be switched by the control signal sent from the controller 37 to obtain an AC voltage of predetermined voltage and frequency (for example, 100 V, 60 Hz) from the outlet 28.

When power of the auxiliary battery 13 is output as an AC voltage having voltage and frequency for electric appliances from the connecting portion 20, the switches 31, 32 are switched to electrically connect the outlet 28 and the filter 26 to each other. In other words, the outlet 28 is connected to the bidirectional inverter 21. Then, the plug of an electric appliance is connected to the outlet 28. In this state, the switching elements 35, 36 are controlled to be switched by the control signal sent from the controller 37 so as to obtain the AC having predetermined voltage (for example, 100 V) from the first secondary winding L2 of the transformer 14. Then, the AC voltage is supplied to the second secondary winding L3 of the transformer 14 and an AC voltage is induced in the first secondary winding L2.

The switching elements S5-S8 of the H bridge circuit 22 of the bidirectional inverter 21 that is connected to the first secondary winding L2 are controlled to be switched to convert the AC voltage induced in the first secondary winding L2 to the DC voltage. As a result, the converted DC voltage is supplied to the H bridge circuit 23. Each of the switching elements S9-S12 of the H bridge circuit 23 is controlled to be switched by the control signal sent from the controller 37 to output the AC voltage having the predetermined voltage and frequency (for example, 100 V, 60 Hz) from the outlet 28.

The first embodiment has following advantages.

(1) In the power supply unit 11, the main battery 12 is connected to the system supply in an electrically insulated state via the transformer 14. The power supply unit 11 has the first bridge circuit 15 and the H bridge circuits 22, 23. The first bridge circuit 15 is connected to the primary winding L1 of the transformer 14 and has four switching elements S1-S4. The H bridge circuits 22, 23 are connected to the first secondary winding L2 of the transformer 14 and have four switching elements S5-S8, S9-S12, respectively. The power supply unit 11 further has the connecting portion 20 and the auxiliary battery 13. The connecting portion 20 is connected to the H bridge circuit 23 via the switches 31, 32, the wirings 29, 30 and the filter 26. The auxiliary battery 13 is capable of being connected to the main battery 12 (first circuit) and the connecting portion 20 (second circuit) via the DC/DC converter. Further, the power supply unit 11 has the controller 37 that controls the switching elements S1-S4 of the first bridge circuit 15, the switching elements S5-S12 of the H bridge circuits 22, 23 and the switching elements 35, 36 of the DC/DC converter. The switching elements S1-S12, 35, 36 are activated to output the power of the main battery 12 as the AC voltage having the voltage and frequency for electric appliances from the connecting portion 20 according to the control signal sent from the controller 37. Therefore, the main battery 12 and the auxiliary battery 13 are capable of being charged by the system power supply and output the power for the electric appliances without an exclusive DC/AC inverter.

(2) The auxiliary battery 13 is electrically connected to the second secondary winding L3 of the transformer 14, and the main battery 12 is electrically connected to the primary winding L1 of the transformer 14. Therefore, it is possible to supply power from the auxiliary battery 13 to the first bridge circuit 15 via the transformer 14 to charge the main battery 12. Therefore, in a hybrid car, in an emergency where the main battery 12 is used up and the engine cannot be started, the main battery 12 is temporally charged by the auxiliary battery 13 to start the engine. After the engine is started, the engine drives the motor generator to charge the main battery 12 with the power from the motor generator.

(3) The power supply unit 11 is a power supply for vehicles. Therefore, a battery of a vehicle can be used as a power supply for electric appliances in an area where the system power supply cannot be used in an emergency. Compared to a general hybrid car, it is expected to reduce the emission of carbon dioxide and prevent air pollution. Since the main battery 12 is charged with midnight power, the fuel cost of the hybrid car is reduced.

(4) The transformer 14 is integrally provided with the DC/DC converter (DC/DC conversion circuit) that selectively supplies power charged to the auxiliary battery 13 to one of the main battery 12 and the connecting portion 20. Therefore, the device is reduced in size and can be cooled with air, and the main battery 12 can be modularized with a pack.

(5) The power supply unit 11 has the bidirectional inverter 21 having two H bridge circuits 22, 23 between the transformer 14 and the connecting portion 20. Therefore, when the main battery 12 is charged by the system power supply, the AC voltage of a sine wave supplied from the system power supply is easily converted such that the AC of the rated charging voltage of the main battery 12 can be obtained in the primary winding L1 of the transformer 14. When the auxiliary battery 13 is charged by the system power supply, the AC voltage of a sine wave supplied from the system power supply is easily converted such that an AC of the rated charging voltage of the auxiliary battery 13 can be obtained in the second secondary winding L3 of the transformer 14.

(6) The power supply unit 11 has the plug 27 that can be connected to an outlet of a system power supply and the outlet 28 that can be connected to a plug of an electric appliance. Accordingly, the main battery 12 is charged with the midnight power and the charged power can be used in the daytime. This reduces the electricity cost.

Next, a power supply unit 11 according to a second embodiment is explained with reference to FIG. 4. The power supply unit 11 of the second embodiment differs from that of the first embodiment in the circuit configuration of the transformer and the circuit configuration connected to the auxiliary battery 13. Other configurations are same as those in the first embodiment. Therefore, the same numerals or symbols are applied to the same portions and detailed explanation thereof is omitted.

Figure 4:
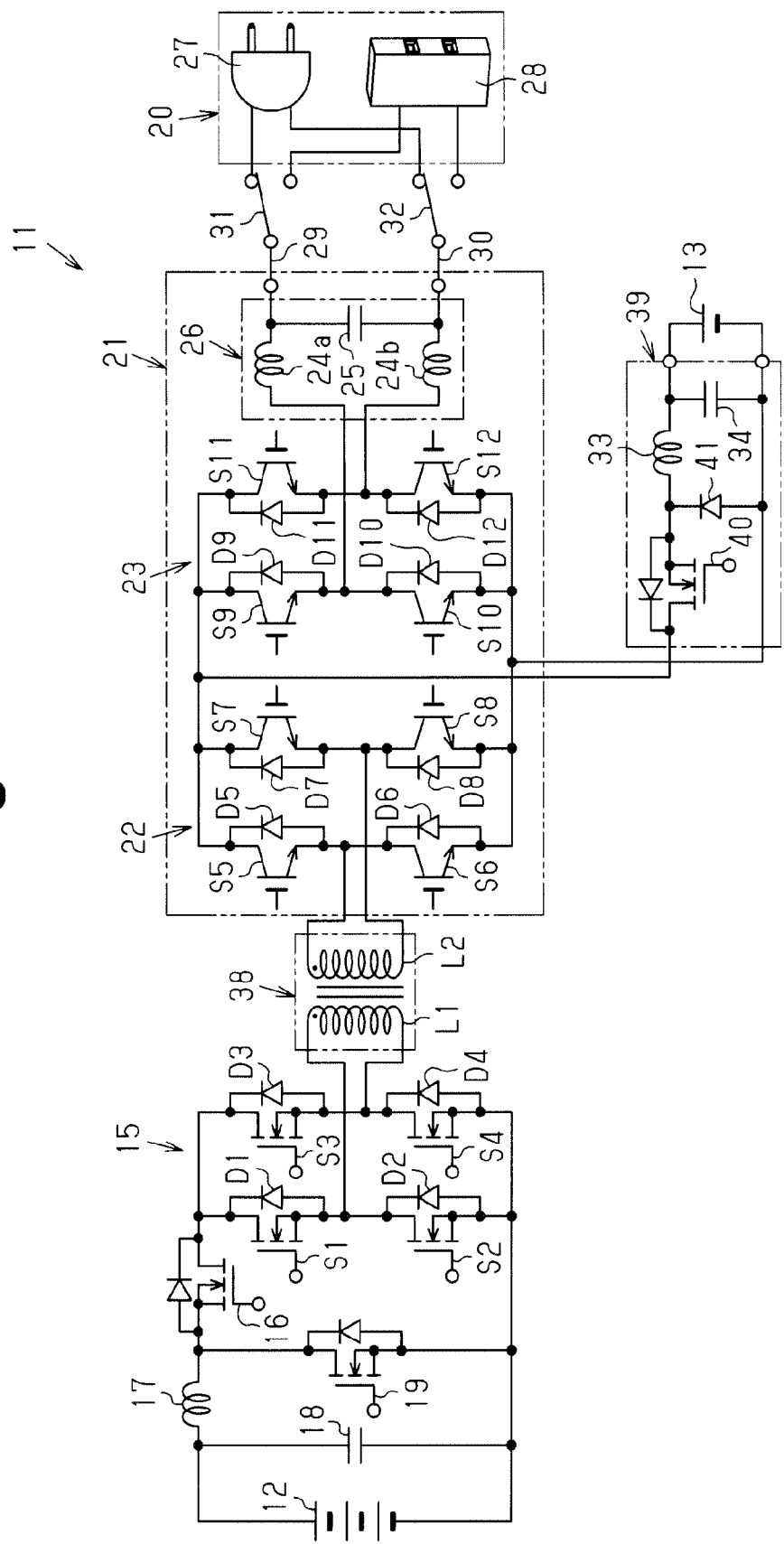
FIG. 4 is a circuit diagram of a power supply unit according to a second embodiment of the present invention.

As shown in FIG. 4, the main battery 12 and the connecting portion 20 are connected to each other via a transformer 38 in the electrically insulated state. The transformer 38 has the primary winding L1 that is connected to the first bridge circuit 15 and the first secondary winding L2 that is connected to the bidirectional inverter 21. The auxiliary battery 13 is connected to the H bridge circuit 23 via a DC/DC converter (DC/DC conversion circuit) 39. In other words, the auxiliary battery 13 is not connected to the connecting portion 20 via the transformer 38 in the electrically insulated state, but is electrically and directly connected to the connecting portion 20 (second circuit).

The DC/DC converter 39 has a coil 33, a capacitor 34, a switching element 40, and a diode 41. The switching element 40 is a MOSFET. The drain of the switching element 40 is connected to the collector of the switching element S9, and the source of the switching element 40 is connected to the positive terminal of the auxiliary battery 13 via the coil 33. The emitter of the switching element S10 of the H bridge circuit 23 is connected to the negative terminal of the auxiliary battery 13. The cathode of the diode 41 is connected to a node between the source of the switching element 40 and the coil 33, and the anode of the diode 41 is connected to the negative terminal of the auxiliary battery 13.

The capacitor 34 is connects the node between the coil 33 and the positive terminal of the auxiliary battery 13 and the negative terminal of the auxiliary battery 13 to each other.

As in the first embodiment, the power supply unit 11 of the second embodiment allows the main battery 12 to be charged by the system power supply, and to output the power of the main battery 12 from the connecting portion 20 as an AC voltage having the voltage and frequency for electric appliances. However, the DC/DC converter 39 has only functions as a step-down converter. Therefore, the DC/DC converter 39 does not increase the output voltage from the auxiliary battery 13 to charge the main battery 12 and does not use the output voltage from the auxiliary battery 13 for the electric appliances through the connecting portion 20.

When the auxiliary battery 13 is charged by the system power supply, the AC voltage is supplied from the system power supply to the H bridge circuit 23 via the plug 27 and the filter 26 in a state that the plug 27 is connected to the outlet of the system power supply. The switching elements S9-S12 of the H bridge circuit 23 are controlled such that the AC voltage is converted to a DC voltage, and the DC voltage is supplied to the DC/DC converter 39. The switching element 40 of the DC/DC converter 39 is controlled by the controller 37 so as to lower the DC voltage supplied from the H bridge circuit 23 to the rated charging voltage of the auxiliary battery 13. The DC voltage that is reduced to the rated charging voltage is charged to the auxiliary battery 13. The relationship between a switching cycle T (the sum of the ON time ton and the OFF time toff), the ON time ton, the input voltage Vin, and the output voltage Vout (charging voltage) is represented by the following formula.

$$Vout/Vin = ton/T$$

When the auxiliary battery 13 is charged by the main battery 12, the switching elements 16, 19 and the switching elements S1-S4 are controlled in the same manner as in the case in which the power of the main battery 12 is output from the connecting portion 20 as the AC voltage having the voltage and frequency for electric appliance. An AC of a predetermined voltage (for example, 100 V) is induced in the first secondary winding L2. The switching elements S5-S8 of the H bridge circuit 22 that is connected to the first secondary winding L2 are controlled to be switched to convert the AC voltage induced in the first secondary winding L2 to a DC voltage, and the converted DC voltage is supplied to the DC/DC converter 39. The switching element 40 of the DC/DC converter 39 is controlled by the controller 37 such that the DC voltage supplied from the H bridge circuit 22 is reduced to the rated charging voltage of the auxiliary battery 13. The DC voltage reduced to the rated charging voltage is charged to the auxiliary battery 13.

Therefore, the second embodiment has the following advantages in addition to the advantages of (1), (3), (6) of the first embodiment.

(7) The auxiliary battery 13 is electrically and directly connected to the connecting portion 20 (second circuit) via the DC/DC converter 39. This simplifies the configuration of the DC/DC converter 39, which allows the auxiliary battery 13 to be connected the main battery 12 (first circuit) and the connecting portion 20 (second circuit).

The above embodiments are not limited to thereto, but may be modified as follows.

The bidirectional inverter 21 do not necessarily have two H bridge circuits 22, 23 but may have one H bridge circuit. However, the bidirectional inverter 21 having two H bridge circuits 22, 23 can effectively charge the main battery 12 with the AC voltage of a sine wave from the system power supply and effectively output the AC voltage of a sine wave from the outlet 28 using the main battery 12 as the power supply.

Instead of the H bridge circuit, other bridge circuit having four switching elements may be provided.

The switching elements used in the H bridge circuits 22, 23 do not need to be MOSFETs but may be IGBTs. The switching elements used in the first bridge circuit 15 do not need to be IGBT, but may be a MOSFET.

The vehicle is not limited to a hybrid car but may be an electric car having a battery as the power supply or an electric car having a fuel cell and a battery as the power supply.

The voltage of the main battery 12 is not limited to 200 V, but may be higher or lower than 200 V.

In the power supply unit 11 for a vehicle using two kinds of voltages of 12 V and 42 V for an auxiliary device, an auxiliary battery having output voltage of 12 V and an auxiliary battery having output voltage of 42 V may be provided.

As long as the AC voltage supplied to the outlet 28 has voltage and frequency for electric appliances, the AC voltage supplied to the outlet 28 is not limited to the voltage of 100 V and 60 Hz, but may be, for example, a voltage of 100 V and 50 Hz, 200 V and 50 Hz, or a voltage of 200 V and 60 Hz. If the power supply unit 11 is used in a foreign country, the AC voltage supplied to the outlet preferably has voltage and frequency applied to the standard of the system power supply in the country.

The switches 31, 32 are not necessarily switched at the node of the relay but may be switched manually.

The power supply unit 11 is not limited to the use in vehicles. For example, the power supply unit 11 may be used as a power supply unit in a factory, an office or a house, and the midnight power is charged to the main battery 12 and the charged power may be used in the daytime. In this case, the output voltage of the auxiliary battery 13 is not limited to 12 V or 42 V but may be set to appropriate voltage corresponding to an objective.

What is claimed is:

1. A power supply unit that is provided with a main battery and an auxiliary battery which supplies a voltage lower than the main battery, the power supply unit allowing the main battery and the auxiliary battery to be charged by a system power supply, the power supply unit comprising:
    a first circuit including the main battery, switching elements, a coil and a first bridge circuit, the first bridge circuit being formed by four switching elements and connected to the main battery via the switching elements and the coil, wherein the switching elements contain a first switching element that is connected to the first bridge circuit and the main battery via the coil and a second switching element that is connected in parallel to the main battery and the coil;
    a second circuit including a connecting portion for the system power supply and a second bridge circuit that is connected to the connecting portion and includes two H bridge circuits, each H bridge circuit being formed by four switching elements;
    a transformer connecting the first circuit and the second circuit to each other in an electrically insulated state, the transformer having a primary winding connected to the first bridge circuit and a secondary winding connected to the second bridge circuit;
    a DC/DC converter that allows the auxiliary battery to be connected to the first and second circuits, the converter including a switching element; and
    a controller that controls the switching elements of the first bridge circuit, the switching elements of the second bridge circuit, and the switching element of the DC/DC converter such that power that has been charged to the main battery and the auxiliary battery is output as an AC voltage having voltage and frequency for electric appliances.

2. The power supply unit according to claim 1, wherein the auxiliary battery is connectable to the first and second circuits via the transformer.

3. The power supply unit according to claim 2, wherein the secondary winding is a first secondary winding, and wherein the transformer further includes a second secondary winding that induces an AC voltage based on the voltage supplied to the primary winding of the transformer.

4. The power supply unit according to claim 1, wherein the auxiliary battery is electrically and directly connectable to the first and second circuits without the transformer in between.

5. The power supply unit according to claim 1, wherein the first bridge circuit includes an H bridge circuit.

6. The power supply unit according to claim 1, wherein the power supply unit is mounted on a vehicle.

7. A power supply unit that is mounted on a vehicle and provided with a main battery and an auxiliary battery which supplies a voltage lower than the main battery, the power supply unit allowing the main battery and the auxiliary battery to be charged by a system power supply, the power supply unit comprising;
    a first circuit including the main battery, switching elements, a coil and a first bridge circuit, the first bridge circuit being formed by four switching elements and connected to the main battery via the switching elements and the coil, wherein the switching elements contain a first switching element that is connected to the first bridge circuit and the main battery via the coil and a second switching element that is connected in parallel to the main battery and the coil;
    a second circuit including a connecting portion for the system power supply and a second bridge circuit that is connected to the connecting portion and include two H bridge circuits, each H bridge circuit being formed by four switching elements;
    a transformer connecting the first circuit and the second circuit to each other, the transformer having a primary winding connected to the first bridge circuit and a secondary winding connected to the second bridge circuit;
    a DC/DC converter that allows the auxiliary battery to be connected to the first and second circuits, the converter including a switching element;
    a controller that controls the switching elements of the first bridge circuit, the switching elements of the second bridge circuit, and the switching element of the DC/DC converter such that power that has been charged to the main battery and the auxiliary battery is output as an AC voltage having voltage and frequency for electric appliances; and
    a filter that is connected to the connecting portion and the second bridge circuit.

* * * * *